2,847,403
Patented Aug. 12, 1958

2,847,403

METHOD FOR PREPARING POLYAMPHOLYTES BY ESTERIFYING A CARBOXYL GROUP CONTAINING POLYMER WITH AN N,N-DIALKYL FORMAMIDE COMPLEX OF AN AMINOALCOHOL

Leo L. Contois, Jr., Corpus Christi, Tex., assignor to Monsanto Chemical Company, St. Louis, Mo., a corporation of Delaware No Drawing. Application September 8, 1955
Serial No. 533,238

10 Claims. (Cl. 260—78.5)

The present invention relates to methods of preparing amphoteric polyelectrolytes.

Polymeric materials containing ionizable functional groups are known compounds and are referred to generically as polyelectrolytes. The best known of the polyelectrolytes contain acidic functional groups such as the carboxyl group and the sulfonic acid group. When these compounds ionize in water, the polymeric chain becomes an anion and such ionized polymers are referred to as polyanions. Polyelectrolytes which contain basic groups such as amines are also known. When these compounds ionize in water, the polymeric chain becomes a cation and such ionized polymers are referred to as polycations. Polyelectrolytes which contain both acidic and basic functional groups are also known. Depending upon the pH of the solution in which they are dissolved, such polymers can ionize to form either a cation or an anion and are referred to as polyampholytes. These polyampholytes, although highly desired for many applications, have remained essentially laboratory curiosities because of the difficulty in preparing same. To date, the only known method for obtaining such polyampholytes has been to interpolymerize a monomer containing a basic functional group with a monomer containing an acidic functional group. Such interpolymerizations are difficult to carry out and many of the monomers required are expensive and not readily available.

Accordingly, it is an object of this invention to provide an improved method for preparing polyampholytes.

Another object of this invention is to provide a method for preparing polyampholytes which is based upon readily available and inexpensive raw materials.

Other objects and advantages of the present invention will become apparent from the following detailed description thereof.

It has been discovered that polyampholytes can be prepared by esterifying an alkali-soluble carboxyl group containing polymer with an N,N-dialkylformamide complex of a monohydric aliphatic aminoalcohol. A typical example of the method of the present invention is the esterification of an ethylene-maleic anhydride interpolymer with the N,N-dimethylformamide complex of N,N-dimethylethanolamine in an aromatic solvent such as benzene.

The following examples are set forth to more clearly illustrate the principle and practice of this invention to those skilled in the art. All parts are by weight.

*Example I*

A total of 15 parts of an isobutylene-maleic anhydride interpolymer containing isobutylene and maleic anhydride in an equimolar ratio is suspended in 265 parts of benzene in a 3-neck round bottom flask fitted with a Dean-Stark moisture trap and mechanical stirrer. The suspension is stirred and refluxed until all moisture is removed from the system and colected in the moisture trap.

The reaction mixture is stirred well and 16 parts of an equimolar N,N-dimethylformamide complex of N,N-dimethylethanolamine is added to the reaction mixture over a period of 15 minutes. The quantity of aminoalcohol complex added is sufficient to esterify 50% of the carboxyl groups of the polymer. Stirring and reflux are continued for 5 hours to complete the esterification and the solid reaction product is recovered by filtration. The polymer is solube in water, dilute hydrochloric acid and dilute sodium hydroxide.

*Example II*

Example I is repeated except that the isobutylene-maleic anhydride interpolymer is replaced with 21 parts of a polymer containing 1 molar portion of styrene, 0.8 molar portion of maleic anhydride and 0.2 molar portion of the half methyl ester of maleic acid. The product is soluble in water, dilute hydrochloric acid and dilute sodium hydroxide.

*Example III*

Example II is repeated except that toluene is used in lieu of benzene as the reaction medium and the quantity of N,N-dimethylformamide complex of N,N-dimethylethanolamine employed is sufficient to esterify 60% of the carboxyl groups of the interpolymer. The product is readily soluble in water and dilute hydrochloric acid, but only sparingly soluble in dilute sodium hydroxide.

*Example IV*

Example I is repeated except that the isobutylene-maleic anhydride interpolymer is replaced with 16 parts of an interpolymer containing 1 molar portion of vinyl acetate, 0.6 molar portion of maleic anhydride and 0.4 molar portion of the half methyl ester of maleic acid. The product is extremely hygroscopic and is soluble in both dilute hydrochloric acid and dilute sodium hydroxide.

*Example V*

Example I is repeated except that the isobutylene-maleic anhydride interpolymer is replaced with 14 parts of an interpolymer containing vinyl methyl ether and maleic anhydride in an equimolar ratio. The product is soluble in water, dilute hydrochloric acid and dilute sodium hydroxide.

*Example VI*

Example I is repeated except that the isobutylene-maleic anhydride interpolymer is replaced with 13 parts of an interpolymer containing ethylene and maleic anhydride in an equimolar ratio. The product is soluble in water, dilute hydrochloric acid and dilute sodium hydroxide.

*Example VII*

Example I is repeated except that the isobutylene-maleic anhydride interpolymer is replaced with 14 parts of anhydrous polyacrylic acid. The product is soluble in water, dilute hydrochloric acid and dilute sodium hydroxide.

*Example VIII*

Example I is repeated except that the isobutylene-maleic anhydride interpolymer is replaced with 17 parts of an interpolymer containing methacrylic acid and vinyl acetate in an equimolar ratio and that the benzene solvent is replaced with xylene. The product is soluble in water, dilute hydrochloric acid and dilute sodium hydroxide.

*Example IX*

Example VIII is repeated except that the vinyl acetate-methacrylic acid interpolymer is replaced with 17 parts of an interpolymer containing 30 weight percent butadiene and 70 weight percent methacrylic acid. The product is soluble in water, dilute hydrochloric acid and dilute sodium hydroxide.

Essentially any alkali-soluble carboxyl group containing polymer can be used in the preparation of the polyampholytes of this invention, although obviously the properties of the final polyampholyte will be somewhat dependent upon the particular carboxyl group containing polymer employed in its preparation. The number of carboxyl groups contained in the alkali-soluble polymer will be in excess of the number required to render it alkali-soluble, since a substantial portion of the carboxyl groups will be esterified by the N,N-dialkylformamide complex of the monohydric aminoalcohol in the preparation of the polyampholytes. The precise number of carboxyl groups required in the alkali-soluble polymer will vary widely depending upon the nature of the polymer containing the carboxyl groups and also upon the degree of esterification subsequently employed in the preparation of the polyampholyte. When carboxyl groups are incorporated in a basic polyvinyl acetate polymer, as by interpolymerizing a carboxyl containing monomer with vinyl acetate, only a small number of carboxyl groups are required, since polymers of vinyl acetate are relatively hydrophilic. When, however, carboxyl groups are incorporated in a basically hydrocarbon polymer, as by interpolymerizing a carboxyl containing monomer with butadiene, a substantial number of carboxyl groups is required to solubilize the interpolymer. In general, one carboxyl group should be present for each 2 or 3 monomeric units contained in the polymer chain. Hencefore, whenever reference is made to a carboxyl group containing polymer it will be understood that it contains sufficient carboxyl groups to be alkali-soluble. For the purpose of this invention a polymer is considered to be alkali-soluble if 1% of the polymer will dissolve in 5% NaOH at 20° C.

The alkali-soluble carboxyl group containing polymers used in the preparation of the polyampholytes of this invention can be prepared in many ways. The most convenient method of preparing such polymers is to simply homopolymerize or interpolymerize a carboxyl containing ethylenic monomer such as acrylic acid, methacrylic acid, crotonic acid, itaconic acid, sorbic acid, etc. Typical examples of such carboxyl group containing polymers include polyacrylic acid, polymethacrylic acid, interpolymers of acrylic or methacrylic acid with vinyl chloride, styrene, α-methylstyrene, butadiene, vinyl acetate, acrylic acid esters, etc.

As an alternative procedure, the carboxyl group containing polymer can be obtained by hydrolyzing, by known methods, polymers containing nitrile groups, amide groups or ester groups. More specifically, such carboxyl group containing polymers can be obtained by hydrolyzing homopolymers and interpolymers of acrylic acid esters, acrylamide, acrylonitrile, etc.

The carboxyl group containing polymers that are preferred for use as intermediates in the process of the present invention are interpolymers of maleic acid or maleic anhydride. In addition to maleic acid or maleic anhydride, such interpolymers contain an interpolymerizable compound which when in the monomeric form contains the grouping:

$$CH_2=C<$$

Preferably the $CH_2=C<$ group is free of reactive functional groups such as hydroxyl groups, carboxyl groups, amide groups, amino groups, etc. Typical comonomers that may be interpolymerized with maleic acid or maleic anhydride include vinyl halides such as vinyl chloride, vinyl bromide, etc.; vinylidene chloride; olefins such as ethylene, isobutylene, amylene; vinyl esters of carboxylic acids such as vinyl acetate, vinyl propionate, vinyl butyrate, vinyl benodate; esters of unsaturated acids such as methyl acrylate, ethyl acrylate, butyl acrylate, allyl acrylate and the corresponding esters of methacrylic and ethacrylic acids; vinyl aromatic compounds such as styrene, o-chlorostyrene, p-chlorostyrene, 2,5-dichlorostyrene, 2,4-dichlorostyrene, p-ethylstyrene, divinyl benzene, vinyl naphthalene, α-methylstyrene; vinyl ethers such as vinyl methyl ether, vinyl isobutyl ether, and the like. It is possible to use maleic acid or maleic anhydride interpolymers of widely varying molecular weights, although it is preferred to employ interpolymers having a specific viscosity of at least 0.1 as determined in a 1% solution of dimethylformamide at 25° C. Such specific viscosities are calculated in accordance with the well known equation:

$$\text{Specific viscosity} = \frac{\text{solution viscosity} - \text{solvent viscosity}}{\text{solvent viscosity}}$$

The preparation of such interpolymers is well known in the art and in general the interpolymer will contain the maleic acid or malic anhydride and the interpolymerizable monomer in substantially equimolar proportions.

In some cases the properties of the final product can be modified by partially esterifying the carboxyl group containing polymer with an aliphatic, heterocyclic or aromatic alcohol prior to reaction with the N,N-dialkylformamide complex of the monohydric aliphatic aminoalcohol. Such a modification can be made by partially esterifying the carboxyl group containing polymer or, preferably, by partially esterifying the carboxyl group containing monomer before preparing the interpolymer by polymerization.

Polyampholytes are prepared by esterifying the carboxyl group containing polymers described above with an N,N-dialkylformamide complex of a monohydric aliphatic aminoalcohol and preferably with an N,N-dialkylformamide complex of a monohydric aliphatic tertiary-aminoalcohol. As used herein and in the appended claims, the term "aliphatic aminoalcohol" means simply that the hydroxyl group is attached to an aliphatic carbon atom. Such aliphatic aminoalcohols may contain aromatic or heterocyclic rings in their structure provided that the hydroxyl group is attached to an aliphatic carbon atom. Examples of the N,N-dialkylformamide complexes of monohydric aliphatic aminoalcohols that can be employed include the N,N-dimethylformamide complexes of monoethanolamine, monoisopropanolamine, N - methylethanolamine, N,N - dimethylethanolamine, N-(β-hydroxethyl)-N'-methyl-1,4-piperazine, etc.

N,N-dialkylformamide complexes are prepared by simply mixing together equimolar proportions of an N,N-dialkylformamide such as N,N-dimethylformamide, N,N-diethylformamide, N-methyl-N-ethylformamide, etc. and a monohydric aliphatic aminoalcohol. The exact chemical nature of the complex is not known, but it is possible that the N,N-dialkylformamide functions similarly to an acid to form a psuedo acid salt of the monohydric aliphatic aminoalchool. The N,N-dialkylformamides employed preferably should contain not more than 4 carbon atoms in each alkyl group and optimum results are obtained when each alkyl group contains not more than 2 carbon atoms.

When the monohydric aliphatic aminoalcohol employed in the reaction contains a primary or secondary amino group, the possibility exists that amino hydrogen atoms will react with carboxyl groups of other chains to form amide groups and cross-link the polymer chains. In a preferred embodiment of the invention monohydric aliphatic aminoalcohols containing only tertiary amino groups are employed to minimize such cross-linking. Such aliphatic aminoalcohols will in general conform to the following formula:

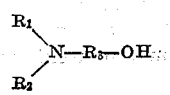

where $R_1$ and $R_2$ are independently selected from the group consisting of alkyl and aryl radicals, and $R_3$ is an alkylene radical.

The esterification of the carboxyl group containing polymer with the N,N-dialkylformamide complex of the monohydric aliphatic aminoalcohol is preferably effected in a liquid reaction medium that is a solvent for the N,N-dialkylformamide complex of the monohydric aliphatic aminoalcohol and essentially a nonsolvent for the carboxyl group containing polymer, the reaction being carried out under conditions such that the water formed in the esterification is removed as formed. Ideally, the reaction medium employed should fulfill the following conditions:

(1) It should be immiscible with water, but form an azeotrope therewith so that water can be removed from the reaction zone by azeotropic distillation.

(2) It should be essentially a nonsolvent for the carboxyl group containing polymer.

(3) It should be a solvent for the N,N-dialkylformamide complex of the monohydric aliphatic aminoalcohol.

(4) It should not react with either the carboxyl group containing polymer or the N,N-dialkylformamide complex of the monohydric aliphatic aminoalcohol.

The lower aromatic hydrocarbon solvents such as benzene and toluene are excellent reaction media in that they are particularly efficacious in azeotropically removing the water of esterfication as it is formed.

The properties of the polyampholytes will be affected by the quantity of monohydric aliphatic aminoalcohol employed in esterifying the carboxyl group containing polymer. To obtain a polyampholyte which ionizes to the same extent in both acidic and basic solutions, the quantity of monohydric aliphatic aminoalcohol employed should be sufficient to esterify approximately one-half of the carboxyl groups of the carboxyl group containing polymer. The employment of such quantities of the monohydric aliphatic aminoalcohol is illustrated in Examples I, V, VI, VII, VIII and IX. Where more than about one-half of the carboxyl groups of the carboxyl group containing polymer are esterified, the resulting polyampholyte will be more soluble in acidic solutions than basic ones. This type of polyampholyte preparation is illustrated in Example III wherein more than one-half of the carboxyl groups are esterified. It is noted that the resulting product is only sparingly soluble in dilute sodium hydroxide solutions. Similarly, where less than about one-half of the carboxyl groups of the carboxyl group containing polymer are esterified, the resulting polyampholyte is apt to be more soluble in basic solutions than acidic ones. Thus, by controlling the number of carboxyl groups in the carboxyl group containing polymer and/or the number of carboxyl groups that are esterified with the monohydric aliphatic aminoalcohol, it is possible to produce polyampholytes having different degrees of solubility in neutral, basic and acidic solutions.

The polyampholytes prepared by the method of this invention have utility in many diverse industrial fields. They are excellent flocculating agents for solids suspended in aqueous solutions and may be employed in beer and soft drink manufacturing processes, in sugar refining, in sewage treatment, etc. The polyampholytes also may be used as soil conditioners and as additives in oil-well drilling muds.

The polyampholytes obtained by esterification of maleic acid or maleic anhydride containing interpolymers with N,N-dialkyl formamide complexes of monohydric aminoalcohols are disclosed and claimed as new compositions of matter in my copending application S. N. 533,239, filed September 1955, now abandoned.

The above descriptions and particularly the examples are set forth by way of illustration only. It will be obvious to those skilled in the art that many modifications thereof can be made without departing from the spirit and scope of the invention herein disclosed.

What is claimed is:

1. A process for preparing polyampholytes which comprises esterifying an alkali-soluble, carboxyl group-containing essentially linear polymer by heating said polymer with an essentially anhydrous organic solution containing less than a stoichiometrically equivalent quantity of an N,N-dialkylformamide complex of a monohydric aliphatic aminoalcohol to a temperature at which substantially all of the hydroxyl groups of the aminoalcohol will react with the carboxyl groups of the alkali-soluble polymer; said organic solvent being free of (1) functional groups reactive with the N,N-dialkylformamide complex of the monohydric aliphatic aminoalcohol and (2) functional groups reactive with the alkali-soluble polymer; said alkali-soluble, carboxyl group-containing polymer being selected from the group consisting of homopolymers of homopolymerizable alpha, beta-ethylenically unsaturated carboxylic acids and interpolymers of (a) a monomer of the group consisting of alpha,beta-ethylenically unsaturated monocarboxylic acids, alpha,beta-ethylenically unsaturated dicarboxylic acids, anhydrides of alpha, beta-ethylenically unsaturated dicarboxylic acids and mixtures thereof and, (b) an interpolymerizable monomer of the group consisting of vinyl halides, vinylidene halides, mono- and di-olefinic hydrocarbons containing 2–5 carbon atoms, vinyl esters of carboxylic acids, esters of alpha,beta-ethylenically unsaturated carboxylic acids, vinyl aromatic hydrocarbons, vinyl ethers and mixtures thereof.

2. The process of claim 1 in which the amino group of the monohydric aliphatic aminoalcohol employed is a tertiary amino group.

3. The process of claim 1 in which the monohydric aliphatic aminoalcohol employed conforms to the formula:

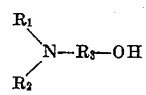

where $R_1$ and $R_2$ are independently selected from the group consisting of alkyl and aryl groups, and $R_3$ is an alkylene radical.

4. A process for preparing polyampholytes which comprises esterifying an alkali-soluble carboxyl group-containing essentially linear polymer by heating said polymer with less than a stoichiometrically equivalent quantity of an N,N-dimethylformamide complex of a monohydric aliphatic aminoalcohol to a temperature at which substantially all of the hydroxyl groups of the aminoalcohol will react with the carboxyl groups of the alkali-soluble polymer in a solvent of the group consisting of benzene, toluene, xylene and mixtures thereof; said alkali-soluble, carboxyl group-containing polymer being selected from the group consisting of homopolymers of homopolymerizable alpha, beta-ethylenically unsaturated carboxylic acids and interpolymers of (a) a monomer of the group consisting of alpha, beta-ethylenically unsaturated monocarboxylic acids, alpha, beta-ethylenically unsaturated dicarboxylic acids, anhydrides of alpha, beta-ethylenically unsaturated dicarboxylic acids and mixtures thereof and (b) an interpolymerizable monomer of the group consisting of vinyl halides, vinylidene halides, mono- and di-olefinic hydrocarbons containing 2–5 carbon atoms, vinyl esters of carboxylic acids, esters of alpha, beta-ethylenically unsaturated acids, vinyl aromatic hydrocarbons, vinyl ethers and mixtures thereof; said monohydric aliphatic aminoalcohol conforming to the formula:

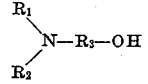

where $R_1$ and $R_2$ are independently selected from the group consisting of alkyl and aryl groups, and $R_3$ is an alkylene radical.

5. A process for preparing polyampholytes which comprises the steps: (1) adding an alkali-soluble, carboxyl group-containing essentially linear polymer to a water-insoluble organic liquid which forms an azeotrope with water, (2) adding an N,N-dialkylformamide complex of a monohydric aliphatic aminoalcohol to the mixture from step (1) and (3) heating the reaction mixture from step (2) to a temperature at which substantially all of the hydroxyl groups of the aminoalcohol will react with the carboxyl groups of the alkali-soluble polymer and at which any water of esterification formed is removed from the reaction system as an azeotrope; the water-immiscible organic liquid employed in step (1) being characterized by (a) being essentially a non-solvent for the alkali-soluble polymer (b) being a solvent for the N,N-dialkyl-formamide complex of the monohydric aliphatic aminoalcohol added in step (2) and (c) being free of functional groups reactive with the alkali-soluble polymer and (d) being free of functional groups reactive with the N,N-dialkyl formamide complex of the monohydric aliphatic aminoalcohol; the molar proportion of the N,N-dialkylformamide complex of the monohydric aliphatic aminoalcohol added in step (2) being sufficient to esterify only a portion of the carboxyl groups of the alkali-soluble polymer; said alkali-soluble carboxyl group-containing polymer being selected from the group consisting of homopolymers of homopolymerizable alpha, beta-ethylenically unsaturated carboxylic acids and interpolymers of (a) a monomer of the group consisting of alpha, beta-ethylenically unsaturated monocarboxylic acids, alpha, beta-ethylenically unsaturated dicarboxylic acids, anhydrides of alpha, beta-ethylenically unsaturated dicarboxylic acids and mixtures thereof and, (b) and interpolymerizable monomer of the group consisting of vinyl halides, vinylidene halides, mono- and di-olefinic hydrocarbons containing 2–5 carbon atoms, vinyl esters of carboxylic acids, esters of alpha, beta-ethylenically unsaturated carboxylic acids, vinyl aromatic hydrocarbons, vinyl ethers and mixtures thereof.

6. The process of claim 5 in which the alkali-soluble, carboxyl group-containing polymer employed is an interpolymer of ethylene and maleic anhydride.

7. The process of claim 5 in which the alkali-soluble, carboxyl group-containing polymer employed is an interpolymer of isobutylene and maleic anhydride.

8. The process of claim 5 in which the alkali-soluble, carboxyl group-containing polymer employed is an interpolymer of styrene and maleic anhydride.

9. The process of claim 5 in which the alkali-soluble, carboxyl group-containing polymer employed is an interpolymer of vinyl acetate and maleic anhydride.

10. The process of claim 5 in which the alkali-soluble, carboxyl group-containing polymer employed is polyacrylic acid.

No references cited.